United States Patent [19]
Hogan et al.

[11] Patent Number: 5,535,337
[45] Date of Patent: Jul. 9, 1996

[54] PORT CIRCUIT FOR A TOKEN RING CONCENTRATOR HAVING PHASE LOCK LOOP TIMING RECOVERY WITH ADDITIONAL CIRCUITRY TO VERIFY APPROPRIATE SIGNALS

[75] Inventors: Thomas C. Hogan, Holden; Peter K. Williams, Newton, both of Mass.

[73] Assignee: 3COM Corporation, Santa Clara, Calif.

[21] Appl. No.: 994,672

[22] Filed: Dec. 22, 1992

[51] Int. Cl.⁶ .................................................... H01J 13/00
[52] U.S. Cl. ................ 395/200.19; 395/550; 364/229.3; 364/270.7; 364/269; 364/DIG. 1
[58] Field of Search ............................. 375/110; 331/14, 331/1, 25; 395/550, 200, 200.19

[56] References Cited

U.S. PATENT DOCUMENTS

| | | | |
|---|---|---|---|
| 4,740,998 | 4/1988 | House | 375/110 |
| 4,774,480 | 9/1988 | Sato et al. | 331/1 |
| 4,949,051 | 4/1990 | Viola | 331/11 |
| 5,052,022 | 9/1991 | Nishita et al | 375/4 |
| 5,084,870 | 1/1992 | Hutchinson et al. | 370/94.1 |
| 5,090,025 | 2/1992 | Marshall et al. | 375/4 |
| 5,173,665 | 12/1992 | Norimatsu | 331/25 |
| 5,276,408 | 1/1994 | Norimatsu | 331/8 |
| 5,304,954 | 4/1994 | Saito et al. | 331/1 |
| 5,313,499 | 5/1994 | Coburn | 375/110 |
| 5,353,313 | 10/1994 | Honea | 375/118 |

OTHER PUBLICATIONS

Product sheets for Texas Instruments TMS 38051 and TMS 38052 Ring Interface Circuits (1986).
ANSI/IEEE Std. 802.5–1985, Chapters 6 and 7.

*Primary Examiner*—Thomas C. Lee
*Assistant Examiner*—Sang Hui Kim
*Attorney, Agent, or Firm*—Fish & Richardson

[57] ABSTRACT

A token ring concentrator port circuit including an upstream data node, a downstream data node, a station receiver node, a station transmitter node, a path switch configured to selectively either connect the upstream data node directly to the downstream data node or connect the station receiver and transmitter nodes between the upstream and downstream data nodes, and a timing recovery circuit including a phase locked loop that derives a recovered clock from data from a station connected to the station receiver and transmitter nodes and reclocks the data with the recovered clock before transmitting the data to the downstream data node, the phase locked loop including a constant gain phase detector, the timing recovery circuit including a frequency limiting circuit, the port circuit components being implemented in a common integrated circuit.

9 Claims, 6 Drawing Sheets

PORT CIRCUIT FOR A TOKEN RING CONCENTRATOR HAVING PHASE LOCK LOOP TIMING RECOVERY WITH ADDITIONAL CIRCUITRY TO VERIFY APPROPRIATE SIGNALS

BACKGROUND OF THE INVENTION

The invention relates to an improved port circuit for token ring networks and to networks and methods employing the improved port circuit.

Local area networks are used to transmit digital data between electronic devices, e.g., data processors such as computers. In a token ring network, the electronic devices are connected to the network at stations that are serially connected by a transmission medium in an endless logical loop, i.e., the ring. The data are transmitted serially in one direction from station to station along the ring, each station receiving the data at its receiver line and repeating or transmitting the data at its transmitter line. A station that obtains access to the network places data on the network addressed for another station. The addressed station copies the information as it passes through it while the nonaddressed stations merely repeat the data and send them along the ring. When the data return to the sending station, they are removed from the ring. Access to the network for placing data on it is controlled by a "token", a unique bit sequence, that is transmitted along the ring. A station obtaining access to the network modifies the token before sending data and restores the token after it has completed sending data, permitting another station to then seize the token and send data.

Token ring networks are often wired in a so-called "star" configuration (e.g., as specified in ANSI/IEEE Standard 802.5), with a concentrator (also referred to as a "hub") at the center and paired transmitter and receiver wires going out from a respective port circuit of the concentrator to each station. Each port circuit has a path switch. The path switches are wired sequentially in a loop at the concentrator. Each path switch can by-pass its station's transmitter and receiver wires (in which case the station is not part of the ring) or connect the receiver and transmitter wires to the upstream and downstream nodes of the path switch (in which case the station is part of the ring and can transmit, receive, and repeat data passed along the ring). Some concentrators, known as active concentrators, have port circuits with amplifiers and equalizers to reduce the effect of attenuation of the signal. Concentrators that do not include such amplifiers and equalizers are known as passive concentrators. Some port circuits have included timing recovery circuits for data received from a station in addition to amplifiers and equalizers.

SUMMARY OF THE INVENTION

In one aspect, the invention features, in general, a port circuit of a token ring concentrator having a path switch and a timing recovery circuit including a phase locked loop between a transmitter node and a downstream data node. The phase locked loop derives a clock from data from the station transmitter and reclocks the data with the recovered clock before transmitting the data to a downstream port circuit. The timing recovery circuit effectively bounds the domain beyond which cross talk, intersymbol interference (ISI), and other link specific impairments can propagate owing to the inherent filtering characteristics. The use of a phase locked loop provides advantages over other timing recovery circuits, such as a tank circuit, because the phase locked loop is stable over time, temperature, and voltage and needs no initial adjustment. In preferred embodiments, the phase locked loop includes a constant gain phase detector, providing improved jitter reduction, and the port circuit includes an amplifier, equalizer, and a transition density detector.

In another aspect, the invention features, in general, a port circuit of a token ring concentrator having both a path switch and a timing recovery circuit implemented in a common integrated circuit chip, providing improved control of cross talk, ISI and other link specific impairments economically and with a high level of integration. In preferred embodiments, the port circuit also has an amplifier, equalizer, and transition density detector implemented in the same integrated circuit.

In another aspect, the invention features, in general, a port circuit of a token ring network having a path switch and a timing recovery circuit including a frequency limit circuit between a transmitter node and a downstream data node. The frequency limit circuit is connected to detect the frequency of the clock generated by the timing recovery circuit and prevent the frequency used for reclocking the data from the station transmitter from varying beyond a predetermined amount from a nominal frequency. In preferred embodiments a first counter generates a square wave pulse with a first period related to the frequency of the recovered clock, and a second counter and an and gate are connected to output a timing control signal having pulses with a much shorter duration at a second period related to the nominal frequency. When the recovered clock and nominal frequencies are equal, the two periods are equal, and the frequency limit circuit also includes a component that detects when the short pulse coincides with one portion of the square wave pulse. In this case, the nominal frequency is used to reclock the data.

Other features and advantages of the invention will be apparent from the following description of a preferred embodiment thereof and from the claims.

DESCRIPTION OF THE PREFERRED EMBODIMENT

The drawings will be described first.

Drawings

Structure and Operation

Figure 1:
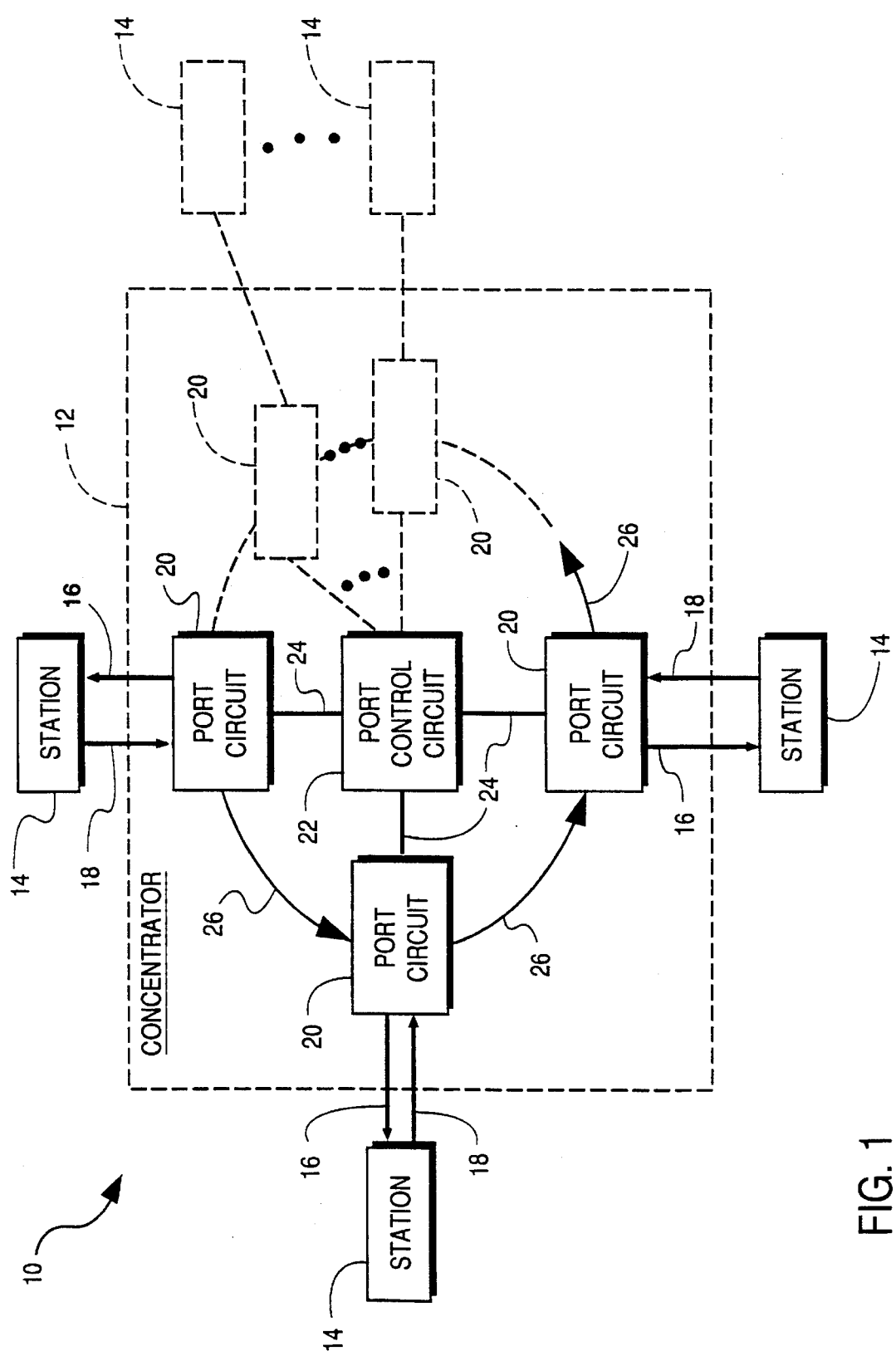
FIG. 1 is a diagram of a token ring local area network employing a concentrator and port circuits according to the invention.

Referring to FIG. 1, token ring local area network 10 includes concentrator 12 connected to stations 14 via respective paired receiver lines 16 and transmitter lines 18. Concentrator 12 includes a port circuit 20 for each station 14 attached to it and port control circuit 22 to provide control and timing signals to port circuits 20 via lines 24. Port circuits 20 are connected to each other in an endless loop via unidirectional, serial data transmission lines 26. As suggested by the port circuits 20 and stations drawn in dashed lines, there could be a large number of port circuits and stations in the network. Network 10 operates in accordance with ANSI/IEEE Standard 802.5.

Figure 2:
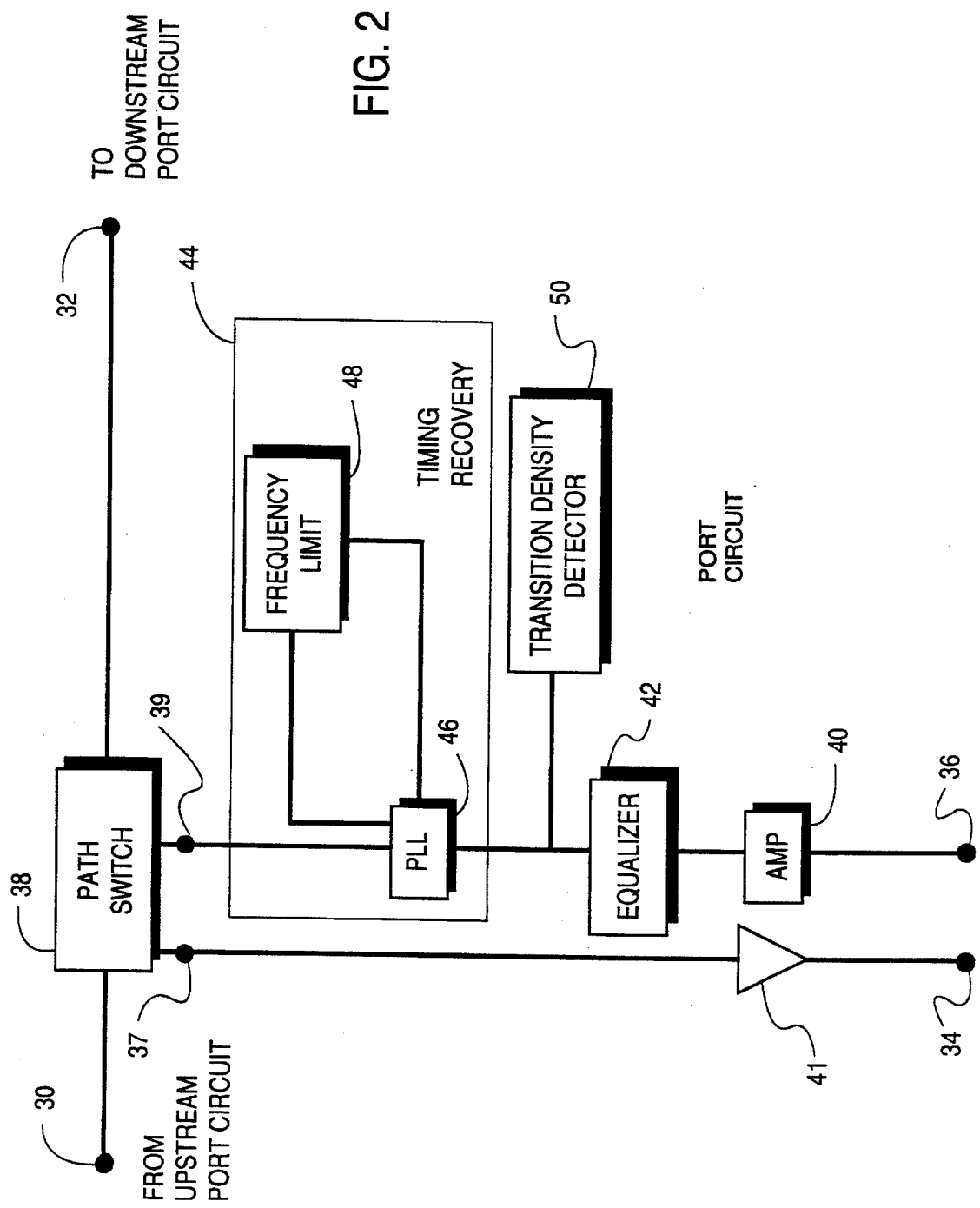
FIG. 2 is a diagram of a port circuit of the FIG. 1 network.

Referring to FIG. 2, each port circuit 20 has upstream data node 30 (connected to upstream data transmission line 26), downstream data node 32 (connected to downstream data transmission line 26), station receiver node 34 (connected to station receiver line 16), and station transmitter node 36 (connected to station transmitter line 18). Path switch 38 is directly connected to upstream data node 30 and downstream data node 32. Node 37 of path switch 38 is connected to station receiver node 34 via transmitter 41, which includes an amplifier and filter to convert ECL logic levels of path switch 38 to levels compatible with the media. Node 39 of path switch 38 is connected to station transmitter node 36 via amplifier 40, equalizer 42, and timing recovery circuit 44. Path switch 38 is controllable to either (a) connect upstream data node 30 directly to downstream data node 32 and connect node 39 to node 34, or (b) connect upstream data node 30 to station receiver node 34 and connect station transmitter node 36 to provide data from its respective station 14 to downstream data node 32. Timing recovery circuit 44 includes phase locked loop (PLL) 46 and frequency limit circuit 48. PLL 46 derives a clock from data from station 14 and reclocks the data with the recovered clock before transmitting the data to port circuit 38 and downstream data node 32. Frequency limit circuit 48 detects the frequency of the recovered clock and prevents it from varying beyond a predetermined amount from a nominal frequency. Amplifier 40 is a limiting amplifier that provides a logic level output. Equalizer 42 is used to compensate for frequency dependent attenuation of the media. Transition density detector 50 is connected to receive the output of equalizer 42. With the exception of transmitter 41, the components of each port circuit 20 are provided on a common integrated circuit according to bipolar technology.

Figure 3:
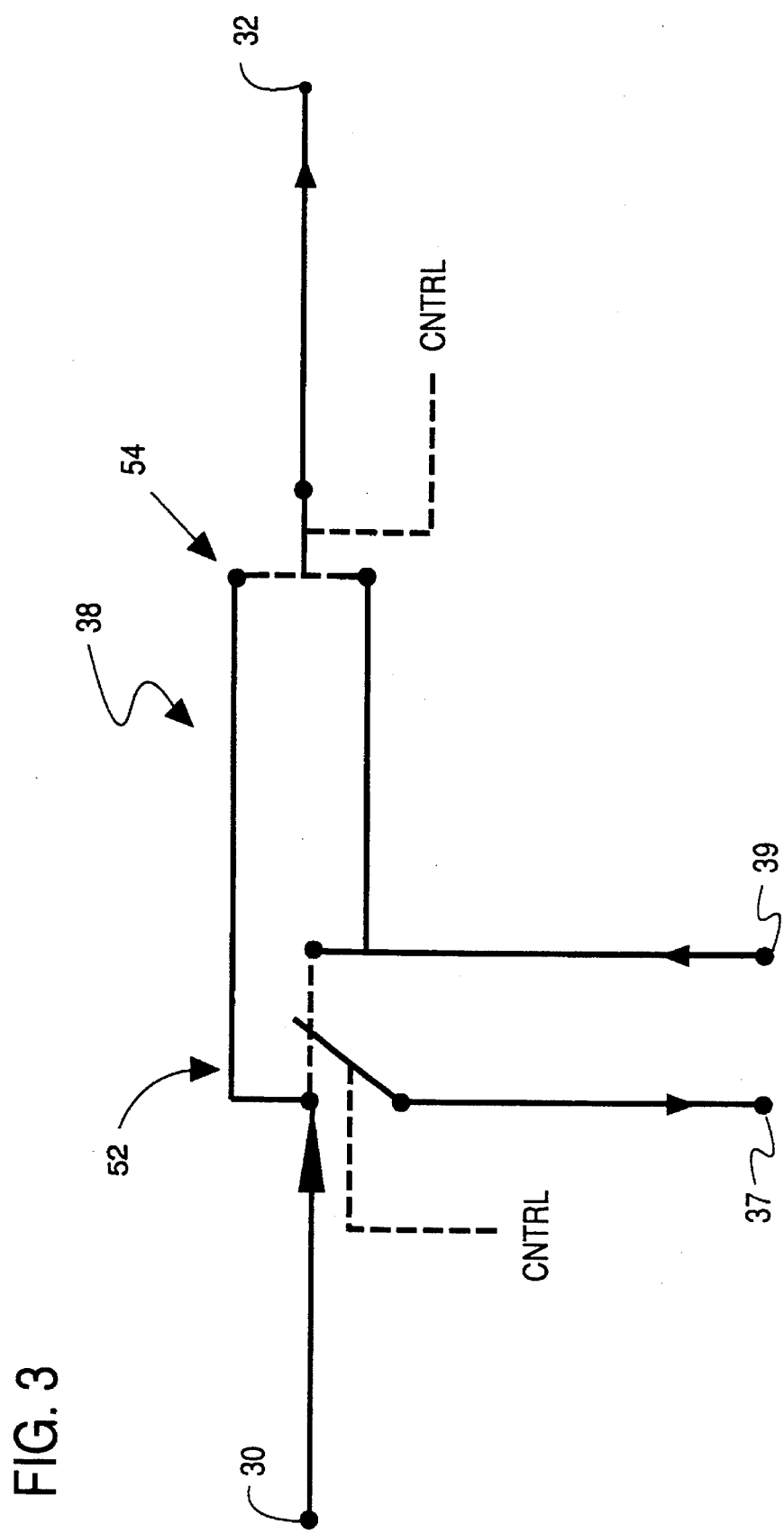
FIG. 3 is a diagram of a path switch of the FIG. 2. port circuit.

Referring to FIG. 3, path switch 38 includes switch 52, which connects station receiver node 34 to upstream data node 30 or node 39, and switch 54, which connects downstream data node 32 to upstream data node 30 or node 39. When switch 54 connects upstream data node 30 to downstream data node 32, data at upstream data node 30 are directly transmitted to downstream data node 32. When switch 52 connects upstream data node 30 to station receiver node 34, and switch 54 connects node 39 to downstream data node 32, data from an upstream station are provided through path switch 38 to station 14, and data from station 14 are provided through path switch 38 to downstream data node 32. When switch 52 connects node 37 to node 39, station 14 and port circuit 38 can be tested.

Figure 4:
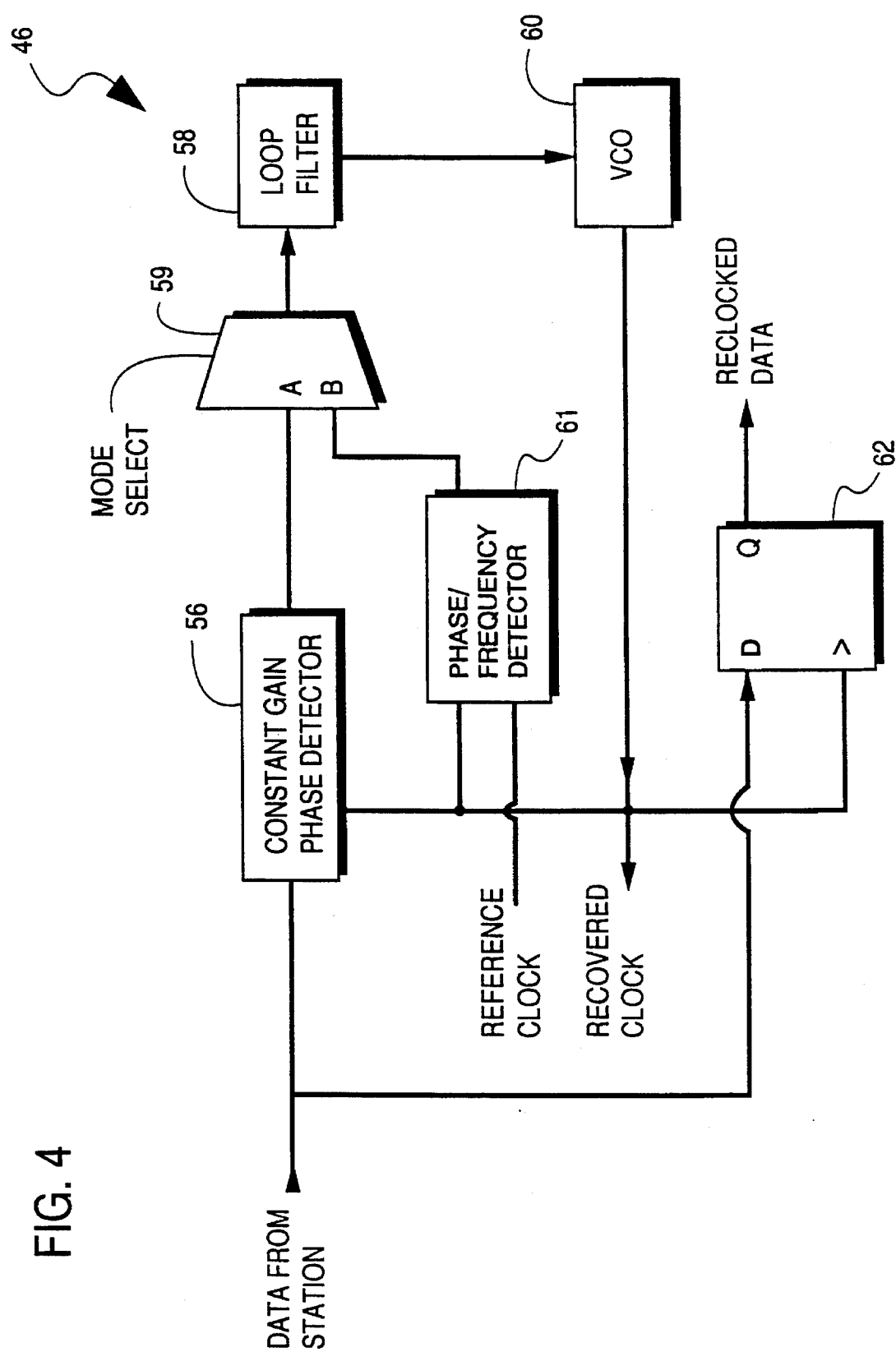
FIG. 4 is a diagram of a phase locked loop of the FIG. 2 port circuit.

Referring to FIG. 4, PLL circuit 46 includes constant gain phase detector 56, loop filter 58, two-to-one multiplexer 59, voltage controlled oscillator (VCO) 60, phase/frequency detector 61, and flip-flop 62. Loop filter 58 includes a charge pump and a low-pass filter. Detector 56, filter 58 and oscillator 60 are configured in a well-known phase locked loop configuration to derive a clock signal, designated "recovered clock" on FIG. 4, when multiplexer 59 passes the output of detector 56 at its A input to filter 58. Phase/frequency detector 61 receives the recovered clock and a reference clock (at the nominal frequency) as inputs and provides the B input to multiplexer 59. Flip-flop 62 captures the data value and reclocks the captured data value according to the recovered clock.

Figure 5:
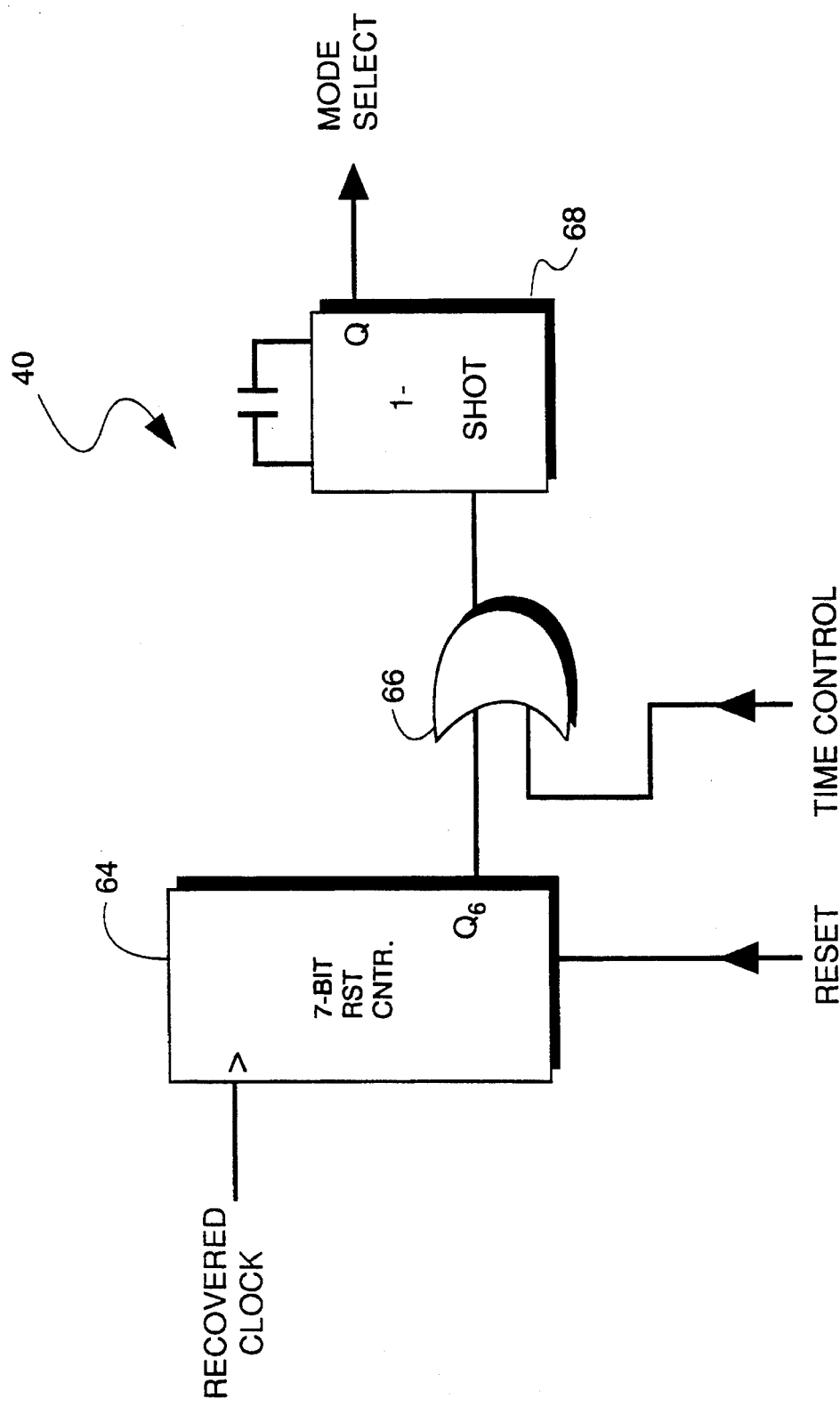
FIG. 5 is a diagram of a frequency limit circuit of the FIG. 2 port circuit.

Referring to FIG. 5, frequency limit circuit 48 includes 7-bit resettable counter 64, or gate 66 and one-shot 68. Counter 64 is clocked by (and thus counts) the recovered clock pulses of PLL 46 and is reset by a RESET signal from port control circuit 22. The $Q_6$ output of counter 64 is provided as one input to or gate 66. The other input to gate 66 is a TIME CONTROL signal from port control circuit 22. One-shot 68 has a 1 ms time.

Figure 6:
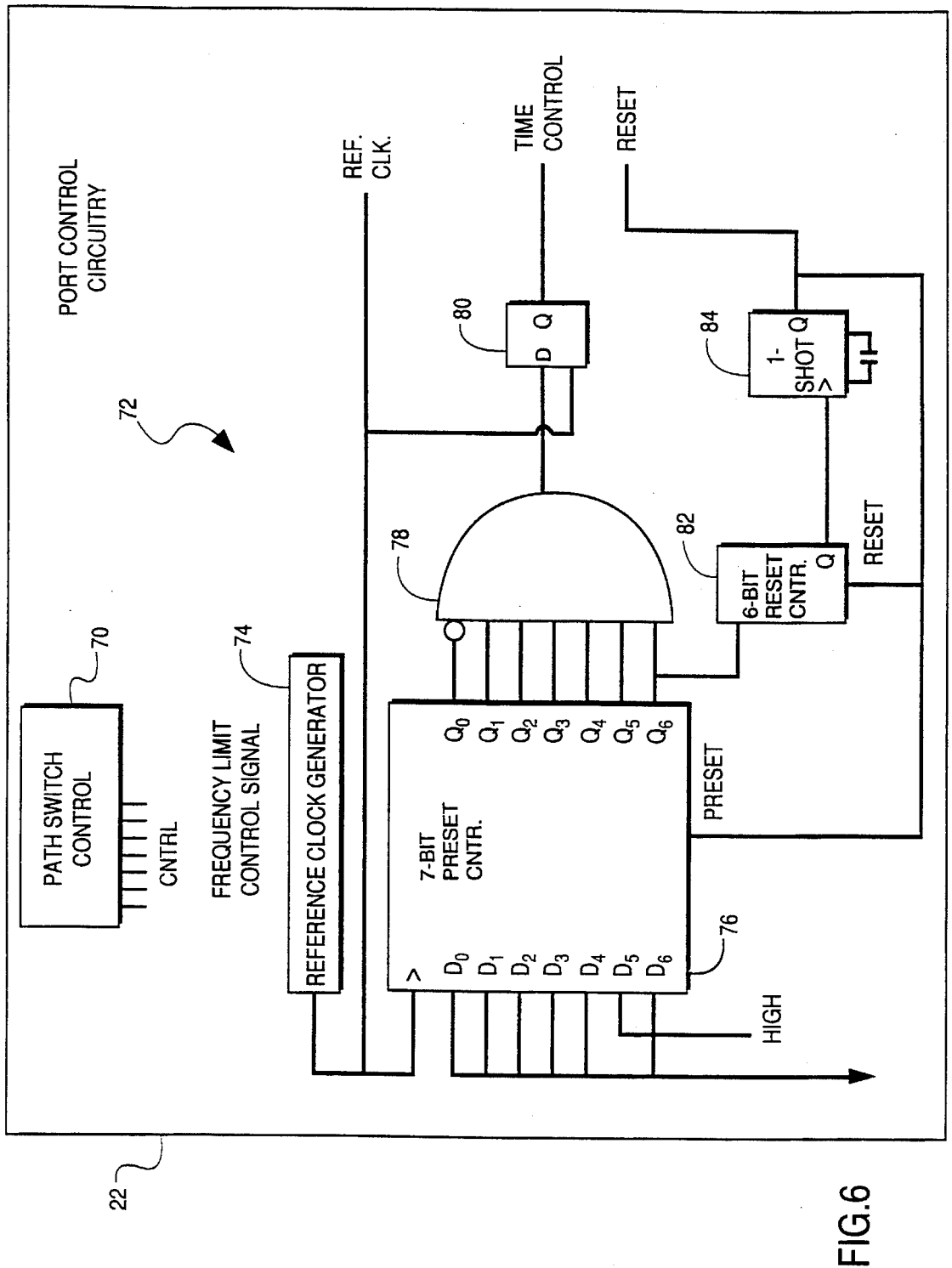
FIG. 6 is a diagram showing components of the port control circuitry of the concentrator of the FIG. 1 network.

Referring to FIG. 6, port control circuit 22 includes path switch control circuit 70, providing CONTROL signals to switches 52, 54 in path switches 38, and frequency limit control signal circuit 72, providing REFERENCE CLOCK, TIME CONTROL and RESET signals for use by the frequency limit circuits 48 in all port circuits 20. Circuit 72 includes reference clock generator 74, 7-bit presettable counter 76, and gate 78, flip-flop 80, 6-bit resettable counter 82, and one-shot 84. Reference clock generator 74 clocks counter 76. The $D_5$ input of counter 76 is wired high, and the remaining inputs are wired to ground, providing a preset count of $2^5$. The $Q_0$ to $Q_6$ outputs of counter 76 are connected as inputs to and gate 78, with the $Q_0$ output only being inverted. The $Q_6$ output of counter 76 is also used to clock counter 82, the most significant bit output of which clocks one-shot 84. One-shot 84 has a 100 ns time; its output is used to preset counter 76 and reset counters 82 and 64. The output of and gate 78 is connected to the data input of flip-flop 80, which is clocked by the reference clock from generator 74 and provides a TIME CONTROL output used by frequency limit circuit 48 in port circuits 20.

In operation, the data are transmitted serially in one direction along transmission lines 26 from one port circuit 20 to the next in an endless loop. The loop also includes the stations 14 that are connected into the endless loop by respective port circuits 20 in which the path switches 38 connect upstream data nodes 30 to station receiver nodes 34, and nodes 39 to downstream data nodes 32.

If a station 14 is not connected into the loop, the path switch 38 at its port circuit 20 simply directly connects upstream data node 30 to downstream data node 32.

If a station 14 is connected into the loop, it receives the data at its receiver line 16. If the data are addressed to this station, the data are copied before repeating the data at its transmitter line 18. If the data are not addressed to this station, the station merely repeats the data at its transmitter line 18. If the data have been sent by this station, they are removed by the station, as they have already been transmitted around the entire loop. If station 14 has obtained access to the network by seizing and modifying the token, it can place data on the network addressed for another station.

Lines 16, 18 to and from stations 14 can be subject to significant cross-talk, particularly when implemented as unshielded twisted pair cable. There also can be significant attenuation of the signal during transmission over the lines and other signal degradations, such as ISI and random noise.

Data transmitted over line 18 to node 36 are amplified at amplifier 40, to overcome attenuation of the signal travelling over line 18, and equalized at equalizer 42, to compensate for frequency dependent attenuation. Transition density detector 50 acts as a frequency detector to make sure that the appropriate signals are being received. The port circuit can operate at more than one data rate, and transition density detector 50 is used to verify that the appropriate rate is being used and that a different type of device, e.g., a video board, has not been plugged in.

In timing recovery circuit 44, PLL 46 derives a clock from the signal output by equalizer 42 and reclocks the data with the recovered clock before transmitting the data to node 39 of port switch 38. Referring to FIG. 4, the output of VCO 60 provides the RECOVERED CLOCK signal, which is used to clock flip-flop 62. The use of a constant gain phase detector 58 in PLL 46 acts to reduce jitter problems. In order to avoid the possibility that PLL 46 could get unlocked and then relock onto a harmonic ratio frequency, frequency limit circuitry 48 (FIG. 5), operating in conjunction with circuit 72 of port control circuitry 22 (FIG. 6), compares the recovered clock with a reference clock; if the recovered frequency varies from the nominal frequency, plus or minus, by more than 0.6%, multiplexer 59 is switched to input B to drive the recovered clock back to the nominal frequency by using phase/frequency detector 61 in place of phase detector 56. In doing this comparison of the recovered and reference clocks, counter 64 divides the recovered clock signal by $2^7$, providing a square wave output at $Q_6$ that is provided as one input to or gate 66. The other input to or gate 66 is the TIME CONTROL signal from circuit 72, which includes a very short pulse. If the recovered clock and the reference clock have precisely the same frequency, this short pulse would be located precisely at the center of low portion of the square wave pulse at $Q_6$; under this condition, one-shot 68 would never fire. This short pulse is generated right before overflow of counter 76 (it occurs before overflow because the $Q_0$ output of counter 76 is inverted), when and gate 78 activates flip-flop 80 and lasts only one clock cycle of counter 64. The short pulse would occur at the center of the low portion of the square wave pulse of $Q_6$ of counter 64, owing to the fact that the $D_5$ preset value of counter 76 is wired high, so that counter 76 begins counting at $2^5$ when counter 64 begins at zero. If there were a slight difference in frequency, the short pulse would begin to move away from the center of the low portion of the pulse out of $Q_6$ of counter 64, and would eventually coincide with the high portion and cause or gate 66 to fire one-shot 68. Counter 82 and one-shot 84 are used to generate reset pulses for counters 64 and 82 and a preset pulse for counter 76 upon counting 26 pulses from $Q_6$ of counter 76. This thus presets counter 76 and resets counters 64 and 82 before the short pulse has a chance to move from the center of the low portion of the square wave to the high portion, and provides the plus or minus 0.6% range for an acceptable recovered clock before overriding the clock derived by PLL 46. The 0.6% narrow range guarantees lock on the incoming data. Firing of one-shot 68, when outside the 0.6% range, changes the mode select input of multiplexer 61, causing the output of phase/frequency detector 61 to be passed through multiplexer 59. Phase/frequency detector 61 compares the phase and frequency of the output of VCO 60 with the reference clock and provides an output to filter 58 that drives VCO 60's output such as to lock on to the reference clock. When the 1 ms pulse of one shot 68 ends, multiplexer 59 returns to input A, returning the short pulse of the TIME CONTROL output to the center of a portion of the square wave from $Q_6$ of counter 64.

Port circuit 20 corrects impairments that receiver lines 16 and transmitter lines 18 put on the data signal of the network.

Port circuit 20 has greater tolerance for degraded signals from receiver and transmitter lines 16, 18. Clock recovery circuit 44 effectively bounds a domain beyond which cross talk, ISI, and other impairments cannot propagate due to its inherent filtering characteristics. The use of a clock recovery circuit 44 in each port circuit 20 of concentrator 12 results in an effective doubling of the attenuation that can be tolerated in each line 16 and 18 while still maintaining the same signal to noise ratio as a passive concentrator or a nonreclocked active concentrator.

Other Embodiments

Other embodiments of the invention are within the scope of the following claims.

What is claimed is:

1. A token ring concentrator comprising a port control circuit, and a plurality of port circuits connected to said port control circuit to receive timing and control signals from said port control circuit, said port circuits being connected to each other in an endless loop via unidirectional, serial data transmission lines, each said port circuit comprising an upstream data node for receiving data from an upstream port circuit, a downstream data node for providing data to a downstream port circuit, a station receiver node for providing data from said upstream port circuit to a station device connected to said port, a station transmitter node for receiving data from said station, a path switch configured to selectively either connect said upstream data node directly to said downstream data node or connect said upstream node to provide said data from an upstream port circuit to said station receiver node and connect said station transmitter node to provide said data from said station to said downstream data node, a timing recovery circuit that derives a recovered clock from data from said station and reclocks said data with said recovered clock before transmitting said data to said downstream data node, an amplifier and equalizer between said station transmitter node add said timing recovery circuit, and a transition density detector that senses the output of said equalizer to verify that appropriate signals are being received from said station transmitter node.

2. A port circuit providing a port of a token ring concentrator comprising an upstream data node for receiving data from an upstream port circuit, a downstream data node for providing data to a downstream port circuit, a station receiver node for providing data from said upstream port circuit to a station connected to said port, a station transmitter node for receiving data from said station, a path switch configured to selectively either connect said upstream data node directly to said downstream data node or connect said upstream node to provide said data from an upstream port circuit to said station receiver node and connect said station transmitter node to provide said data from said station to said downstream data node, and a timing recovery circuit that derives a clock from data from said station and reclocks said data with said clock before transmitting said data to said downstream data node, said path switch and said timing recovery circuit being implemented in a common integrated circuit, wherein said timing recovery circuit includes a phase locked loop, further comprising an amplifier and an equalizer that are implemented on said integrated circuit and are connected between said station transmitter node and said timing recovery circuit, and further comprising a transition density detector that is implemented on said integrated circuit and senses the output of said equalizer to verify that appropriate signals are being received from said station transmitter node.

3. A port circuit providing a port of a token ring concentrator comprising an upstream data node for receiving data from an upstream port circuit, a downstream data node for providing data to a downstream port circuit, a station receiver node for providing data from said upstream port circuit to a station connected to said port, a station transmitter node for receiving data from said station, a path switch configured to selectively either connect said upstream data node directly to said downstream data node or connect said upstream node to provide said data from an upstream port circuit to said station receiver node and connect said station transmitter node to provide said data from said station to said downstream data node, and a timing recovery circuit that derives a clock from data from said station and reclocks said data with said clock before transmitting said data to said downstream data node, said path switch and said timing recovery circuit being implemented in a common integrated circuit, wherein said timing recovery circuit includes a phase locked loop, and further comprising a transition density detector that is implemented on said integrated circuit and is connected between said station transmitter node and said timing recovery circuit to verify that appropriate signals are being received from said station transmitter node.

4. A port circuit providing a port of a token ring concentrator comprising an upstream data node for receiving data from an upstream port circuit, a downstream data node for providing data to a downstream port circuit, a station receiver node for providing data from said upstream port circuit to a station connected to said port, a station transmitter node for receiving data from said station, a path switch configured to selectively either connect said upstream data node directly to said downstream data node or connect said upstream node to provide said data from an upstream port circuit to said station receiver node and connect said station transmitter node to provide said data from said station to said downstream data node, and a timing recovery circuit that derives a clock from data from said station and reclocks said data with said clock before transmitting said data to said downstream data node, said path switch and said timing recovery circuit being implemented in a common integrated circuit, wherein said timing recovery circuit includes a phase locked loop, wherein said phase locked loop includes a constant gain phase detector, wherein said timing recovery circuit includes a frequency limit circuit that is connected to detect the frequency of said clock and prevent it from varying beyond a predetermined amount from a nominal frequency, further comprising an amplifier and an equalizer that are implemented on said integrated circuit and are connected between said station transmitter node and said timing recovery circuit, and further comprising a transition density detector that is implemented on said integrated circuit and senses the output of said equalizer to verify that appropriate signals are being received from said station transmitter node.

5. The port circuit of claim 4 wherein said frequency limit circuit includes a first counter that generates a square wave pulse with a first period related to said frequency of said recovered clock, and wherein said port circuit includes a second counter and an and gate connected to output a timing control signal having pulses with a much shorter duration at a second period related to said nominal frequency, said first and second periods being equal when said frequencies are equal, said frequency limit circuit also including a component that detects when said short pulse coincides with one portion of said square wave pulse.

6. The port circuit of claim 5 wherein said port circuit includes components connected to reset said counters so as to prevent said short pulse from coinciding with said one portion of said square wave unless said two frequencies vary from each other by more than said predetermined amount.

7. A port circuit providing a port of a token ring concentrator comprising an upstream data node for receiving data from an upstream port circuit, a downstream data node for providing data to a downstream port circuit, a station receiver node for providing data from said upstream port circuit to a station connected to said port, a station transmitter node for receiving data from said station, a path switch configured to selectively either connect said upstream data node directly to said downstream data node or connect said upstream node to provide said data from a upstream port circuit to said station receiver node and connect said station transmitter node to provide said data from said station to said downstream data node, and a timing recovery circuit that derives a clock from data from said station and reclocks said data with said clock before transmitting said data to said downstream data node, said timing recovery circuit including a frequency limit circuit that is connected to detect the frequency of said clock and prevent it form varying beyond a predetermined amount from a nominal frequency, further comprising an amplifier and equalizer between said station transmitter node and said timing recovery circuit, further comprising a transition density detector that senses the output of said equalizer to verify that appropriate signals are being received from said station transmitter node.

8. The port circuit of claim 7 wherein said frequency limit circuit includes a first counter that generates a square wave pulse with a first period related to said frequency of said recovered clock, and wherein said port circuit includes a second counter and an and gate connected to output a timing control signal having pulses with a much shorter duration at a second period related to said nominal frequency, said first and second periods being equal when said frequencies are equal, said frequency limit circuit also including a component that detects when said short pulse coincides with one portion of said square wave pulse.

9. The port circuit of claim 8 wherein said port circuit includes components connected to reset said counters so as to prevent said short pulse from coinciding with said one portion of said square wave unless said two frequencies vary from each other by more than said predetermined amount.

* * * * *

UNITED STATES PATENT AND TRADEMARK OFFICE
CERTIFICATE OF CORRECTION

PATENT NO. : 5,535,337

DATED : July 9, 1996

INVENTOR(S) : Hogan et al.

It is certified that error appears in the above-identified patent and that said Letters Patent is hereby corrected as shown below:

Col. 3, line 1, after "stations", please insert --14--.

Col. 6, line 31, please delete "add", and replace with --and--.

Col. 5, line 34, please delete "26" and replace with --$2^6$--.

Signed and Sealed this

Sixteenth Day of December, 1997

*Attest:*

BRUCE LEHMAN

*Attesting Officer*   *Commissioner of Patents and Trademarks*